(12) United States Patent
Leach et al.

(10) Patent No.: US 11,706,256 B2
(45) Date of Patent: *Jul. 18, 2023

(54) SECURE TRAFFIC OPTIMIZATION IN AN EDGE NETWORK

(71) Applicant: Fastly Inc., San Francisco, CA (US)

(72) Inventors: Sean Leach, Castle Pines, CO (US); Artur Bergman, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/347,510

(22) Filed: Jun. 14, 2021

(65) Prior Publication Data

US 2021/0314357 A1 Oct. 7, 2021

Related U.S. Application Data

(63) Continuation of application No. 16/673,573, filed on Nov. 4, 2019, now Pat. No. 11,038,922.

(Continued)

(51) Int. Cl.
*H04L 9/40* (2022.01)
*H04L 67/141* (2022.01)
(Continued)

(52) U.S. Cl.
CPC ............ *H04L 63/166* (2013.01); *H04L 45/72* (2013.01); *H04L 61/5007* (2022.05);
(Continued)

(58) Field of Classification Search
CPC ............ H04L 63/0435; H04L 63/0823; H04L 63/0428; H04L 63/1458; H04L 63/166; H04L 69/16; H04L 61/2007; H04L 61/1511; H04L 67/141; H04L 67/146; H04L 67/12; H04L 45/22; H04L 45/72; H04L 65/1006; H04L 2463/141; H04L 61/5007; H04L 65/1104

(Continued)

(56) References Cited

U.S. PATENT DOCUMENTS 6,584,567 B1 6/2003 Bellwood et al.
8,190,899 B1 * 5/2012 Audebert ............ H04L 12/4633
 713/172

(Continued)

FOREIGN PATENT DOCUMENTS

WO WO02071242 A1 9/2002

*Primary Examiner* — Benjamin A Kaplan

(57) ABSTRACT

A client application establishes a connection between the client application and an origin server over one or more networks. The application generates a request to establish a secure session with the origin server over the connection. The request includes information, in a header of the request, that flags traffic sent during the secure session to a network of the one or more networks as subject to one or more optimizations performed by the network. Subsequent to establishing the secure session, the application encrypts the traffic in accordance with the secure session and sends the traffic to the origin server over the connection, subject to the one or more optimizations. The infrastructure service applies the one or more optimizations to the traffic as it passes through the edge network to the origin server.

20 Claims, 9 Drawing Sheets

Related U.S. Application Data

(60) Provisional application No. 62/861,891, filed on Jun. 14, 2019.

(51) Int. Cl.
| | |
|---|---|
| *H04L 69/16* | (2022.01) |
| *H04L 45/00* | (2022.01) |
| *H04L 67/146* | (2022.01) |
| *H04L 61/5007* | (2022.01) |
| *H04L 67/12* | (2022.01) |
| *H04L 65/1104* | (2022.01) |

(52) U.S. Cl.
CPC ...... *H04L 63/0428* (2013.01); *H04L 63/1458* (2013.01); *H04L 67/141* (2013.01); *H04L 67/146* (2013.01); *H04L 69/16* (2013.01); *H04L 65/1104* (2022.05); *H04L 67/12* (2013.01); *H04L 2463/141* (2013.01)

(58) Field of Classification Search
USPC .......................................................... 726/2
See application file for complete search history.

(56) References Cited

U.S. PATENT DOCUMENTS

| | | |
|---|---|---|
| 8,327,128 B1 | 12/2012 | Prince et al. |
| 2001/0051980 A1 | 12/2001 | Raciborski et al. |
| 2002/0065932 A1 | 5/2002 | Kobayashi |
| 2004/0249971 A1 | 12/2004 | Klinker et al. |
| 2008/0317043 A1 | 12/2008 | Dougherty et al. |
| 2009/0077173 A1 | 3/2009 | Lowery et al. |
| 2009/0282159 A1 | 11/2009 | Wang et al. |
| 2011/0103374 A1 | 5/2011 | Lajoie et al. |
| 2011/0231475 A1 | 9/2011 | Van der Merwe et al. |
| 2012/0136623 A1* | 5/2012 | Edge ............... G01S 5/0236 702/150 |
| 2013/0286846 A1 | 10/2013 | Mias et al. |
| 2013/0290544 A1 | 10/2013 | Kohli |
| 2014/0082212 A1 | 3/2014 | Garg et al. |
| 2014/0321315 A1 | 10/2014 | Akhter et al. |
| 2015/0113166 A1 | 4/2015 | Mosko |
| 2015/0127837 A1 | 5/2015 | Harashima et al. |

\* cited by examiner

SECURE TRAFFIC OPTIMIZATION IN AN EDGE NETWORK

RELATED APPLICATIONS

This application is a continuation of and claims priority to U.S. patent application Ser. No. 16/673,573, entitled "SECURE TRAFFIC OPTIMIZATION IN AN EDGE NETWORK," filed Nov. 4, 2019 as well as U.S. Provisional Patent Application 62/861,891 entitled "SECURE TRAFFIC OPTIMIZATION IN AN EDGE NETWORK," filed Jun. 14, 2019, and which are also hereby incorporated by reference in their entirety.

TECHNICAL FIELD

Aspects of the disclosure are related to the field of computing and communication infrastructure technology and, more particularly, to optimizations for secure traffic in an infrastructure service.

BACKGROUND

Content delivery networks, edge cloud platforms, and other types of infrastructure services send and receive huge volumes of data. Such infrastructure services provide a variety of functions to their customers such as content caching, load balancing, and security. Caching allows content to be stored closer to end users relative to the customer origin servers from which it is obtained. Load balancing distributes incoming traffic across a customer's servers to avoid burdening any one server or point-of-presence (PoP) with an inordinate amount of traffic.

Security in particular has grown in importance as distributed denial-of-service (DDoS) attacks and hacking have become more frequent and destructive. Infrastructure services can provide a security function that shields origin servers from such malicious activity. When acting as a security shield, traffic destined for a given website or service routes through an infrastructure service provider's network, where it can be analyzed and potentially blocked so as to prevent malicious traffic from reaching customer servers.

Infrastructure services also support security protocols such as the transport layer security protocol (TLS) and the secure session layer protocol (SSL). End points establish transport layer connections with the servers in an infrastructure service or at the origin in order to obtain content, such as web pages, images, video, applications, and the like. The end points can also establish secure sessions on top of the transport layer connections using TLS or SSL, for example, allowing the content to be encrypted and delivered securely.

Server name identification (SNI) is an extension to the TLS protocol by which an end point indicates the hostname with which it is attempting to communicate securely over an established connection with a server. SNI allows multiple secure websites or services to be served by the same Internet protocol (IP) address without requiring those websites or services to use the same certificate. For example, SNI may allow an infrastructure service to serve cached content for multiple secure websites or services from the same IP address.

OVERVIEW

Technology is disclosed herein for optimizing the flow of secure traffic in an infrastructure service. In an implementation, an infrastructure service includes an edge network that receives a request, sent by a client application for delivery to an origin server, to establish a secure session over a connection between the client application and the origin server. The request includes information in a header that identifies traffic sent during the secure session as subject to one or more optimizations by the edge network.

The infrastructure service removes the information from the header of the request and passes the request through to the origin server. Subsequent to the client application and the origin server establishing the secure session, the infrastructure service applies the one or more optimizations to the traffic sent by the client application as the traffic passes through the edge network to the origin server.

In the same or another implementation, a client application establishes a connection between the client application and an origin server over one or more networks. The application generates a request to establish a secure session with the origin server over the connection. The request includes information, in a header of the request, that flags traffic sent during the secure session to a network of the one or more networks as subject to one or more optimizations performed by the network. Subsequent to establishing the secure session, the application encrypts the traffic in accordance with the secure session and sends the traffic to the origin server over the connection, subject to the one or more optimizations.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
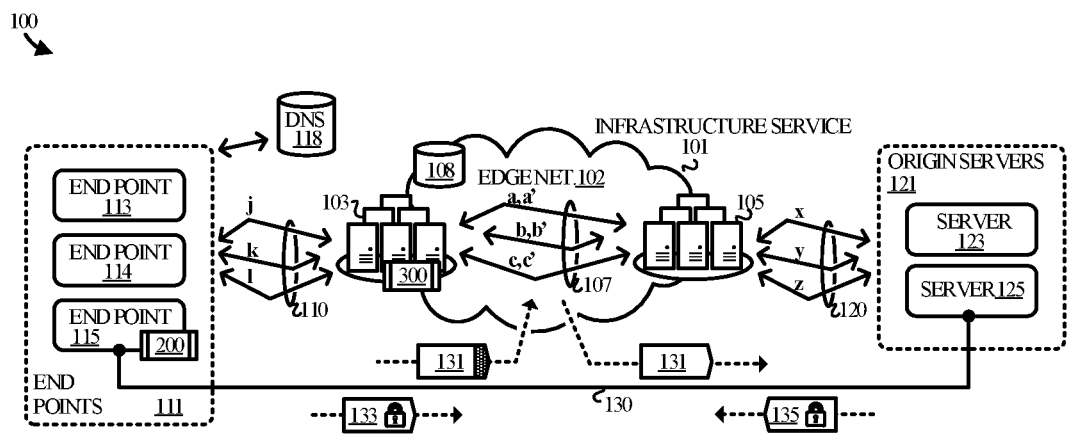
FIG. 1 illustrates an operational architecture in an example implementation of secure traffic optimization.

Technology is disclosed herein that improves the functioning of computing and communication networks. In particular, processes employed by client applications and elements in an infrastructure service are disclosed that allow the infrastructure service to optimize how secure traffic is handled in an edge network. In an implementation, a client application signals to the infrastructure service to apply one or more optimizations to traffic being sent by the application within the context of a secure session over a connection with an origin server. The infrastructure service applies said optimizations as the traffic traverses its edge network.

On the client side, the client application establishes a transport-layer connection with an origin server. The path to the origin server includes the edge network provided by the infrastructure service. Having connected to the origin server, the client application sends a request to conduct a secure session with the origin server.

The request, which is the first message in a handshake process between the client and the origin, includes information in a header of the request that flags the traffic sent during the secure session as subject to one or more optimizations performed by the edge network. The infrastructure service passes the request through to the origin and configures one or more elements in the edge network to optimize the subsequent traffic that is sent in the context of the secure session. For example, the client application and the origin may send and/or receive traffic encrypted in accordance with the parameters of the secure session and the edge network applies the one or more optimizations as the traffic flows through the network.

In some implementations, the transport layer connection operates in accordance with a reliable transport protocol such as the transmission control protocol (TCP), although non-reliable transport protocols such as the user datagram protocol (UDP) may also be used. Examples of secure sessions include transport layer security (TLS) sessions and secure session layer (SSL) sessions. An example of the request sent by the client application is the ClientHello message that begins a TLS handshake, which includes a server name identification (SNI) field. In some implementations, the information that signals to the edge network how to optimize the traffic may be encoded in the SNI field.

Examples of traffic that may be sent and received within the secure session include secure hypertext transfer protocol (HTTPS) traffic, session initiation protocol (SIP) traffic, and Internet of Things (IoT) traffic. The edge network may provide a variety of functions with respect to such traffic, including caching content from customer origins, hosting applications at the edge, and shielding the origins from distributed denial of service (DDoS) attacks.

The edge network may function as a pass-through network for some types of secure traffic such as real-time voice and video communications, secure transactions, and the like. The edge network can provide an accelerator function with respect to such traffic by optimizing the paths taken by the traffic through the network. Traffic can also be accelerated by optimizing the paths taken to and from the network points-of-presence (PoPs).

For instance, the infrastructure service may replace a source address of the traffic sent by the client application with a new source address to influence a return path taken by return traffic sent by the origin server to the client application. In another example, the service may replace a source address of the traffic sent by the origin to influence a return path taken by return traffic sent by the client application to the origin server. Still other examples include selecting an egress point of presence (PoP) of the network to a transit network situated between the network and the origin server and routing the traffic to the egress PoP.

FIG. 1 illustrates an operational architecture 100 in an example implementation of secure traffic optimization. Operational architecture 100 includes infrastructure service 101 in communication with end points 111 and origin servers 121. Infrastructure service 101 provides one or more functions for and/or on behalf of its customers such as edge computing, content caching, image optimization, content streaming, cloud security, load balancing, and traffic acceleration.

Infrastructure service 101 includes one or more data centers, of which data center 103 and data center 105 are representative, connected by edge network 102. Edge network 102 is representative of one or more physical and/or virtual networks capable of connecting multiple data centers—or Points of Presence. Edge network 102 may be, for example, an overlay network that relies on the physical connections provided by one or more other network providers such transit network providers, Internet backbone providers, and the like.

Edge network 102 provides routes 107 to and from the data centers 103 and 105, represented by routes a, b, and c. Data center 103 and data center 105 each provide a Point of Presence (PoP) at an interface point between edge network 102 and other networks via which infrastructure service 101 may communicate with end points 111 and origin servers 121. Examples include transit networks, local Internet service provider (ISP) networks, local area networks (LANs), wide area networks (WANs), wired and wireless networks, virtual networks, software defined networks, and any combination or variation thereof.

One or more networks that connect edge network 102 to end points 111 may be the same as one or more of the networks that provide the physical connectivity of edge network 102. Similarly, one or more of networks that connect edge network 102 to origin servers 121 may be the same as one or more of the networks that provide the physical connectivity of edge network 102. Indeed, one or more of the networks that physically connect edge network 102 to end points 111 may be the same as the one or more of the networks that physically connect edge network 102 to origin servers 121. Data centers 103 and 105 communicate with end points 111 and origin servers 121—and with each other—by way of any suitable networking protocol such as Internet Protocol version 4 (IPv4), IPv6, Internetwork Packet Exchange (IPX), Open Shortest Path First (OSPF) IPsec, and any other network protocol, variation, or combination thereof. Data centers 103 and 105 may in some implementations be connected at the data link layer and as such may communicate via the Ethernet protocol, asynchronous transfer mode (ATM), the Point-to-Point protocol (PPP), and the like.

Traffic sent or received between end points 111 and edge network 102 may take one of multiple routes 110 to data center 103, represented by routes j, k, and l. Traffic sent or received between origin servers 121 and edge network 102 may take one of multiple routes 120 to data center 105, represented by routes x, y, and z. Data center 103 provides a point-of-presence where edge network 102 interfaces with the one or more networks that carry traffic to and from end points 111. Data center 105 provides a point-of-presence where edge network 102 interface with the one or more networks that carry traffic to and from origin servers 121. Edge network 102 may include additional data centers that serve as additional PoPs for interfacing with the same or other networks as data centers 103 and 105.

End points 111, which include end point 113, end point 114, and end point 115, are representative of computing devices capable of communicating with origin servers 121. Examples include—but are not limited to—laptop and desktop computers, tablet computers, mobile phones, wearable devices, entertainment devices, gaming devices, other server computers, Internet of Things (IoT) devices, or any other type of end point device.

Origin servers 121, which include server 123 and server 125, are representative of the various physical and/or virtual computing devices capable of storing content and providing the content via infrastructure service 101 to end points 111. Examples include, but are not limited to, server computers and data storage devices deployed on-premises, in the cloud, in a hybrid cloud, or elsewhere, by content providers such as enterprises, organizations, individuals, and the like. Examples of content included text, images, video, web pages, objects, applications, transactions, or any other type of content.

End points 111 communicate with infrastructure service 101 and origin servers 121 over transport layer connections that are established to facilitate the exchange of data. The connections may be established in accordance with a variety of communication protocols such as the transmission control protocol (TCP), the stream control transmission protocol (SCTP), and other connection-oriented protocols. Connectionless protocols such as the user datagram protocol (UDP) may also be employed in some implementations.

Domain name system (DNS) 118 is a highly simplified representation of a system capable of associating domains names with network addresses. End points 111 communicate with DNS 118 to obtain the network addresses of the various domains the client applications on end points 111 are attempting to reach. Examples includes websites, services, and applications and other such content provided by origin servers 121. Examples of client applications include—but are not limited to: natively installed and executed applications, mobile applications, browser-based applications, streaming applications, and any variation or combination thereof.

DNS 108 is representative of a system within infrastructure service 101 that is also capable of associating domain names with network addresses. DNS 108 may communicate with DNS 118 in some examples to resolve the network address for a domain name. In other examples, DNS 118 may redirect an end point to the network address for DNS 108 so that DNS 108 can resolve the domain name to a network address. Other variations are possible and are considered within the scope of the present disclosure.

In operation, end points 111 submit domain name translation requests to DNS 118 to translate a uniform resource locator (URL) or other such identifier into network addresses with which a given can use to obtain connect, engage in secure transactions, or the like. DNS 118 may communicate with DNS 108 in edge network 102 to resolve the domain name request. It is assumed for exemplary purposes that the network addresses routes to a PoP in edge network 102.

End points 111 address packets to the network address provided by DNS 118 and send them via one or more of paths 110 to edge network 102. In an example of content caching, end points 111 send content requests (e.g. HTTP GET messages) to the aforementioned network addresses, which route to PoPs in edge network 102. The requested content may be served from one of the PoPs or—if the content has not yet been cached or needs to be refreshed—can be obtained from the origin and then served to a given end point.

In such examples, the end points 111 establish transport layer connections with the servers in edge network 102 in order to obtain the requested content. However, in some scenarios the end points 111 establish transport layer connections with servers at the origin, as opposed to (or in addition to) the servers in edge network 102, in order to obtain content directly from the origin, engage in secure transactions or communications, or for other reasons.

Upon connecting to an origin server, an end point proceeds to setup a secure session with the server in accordance with TLS, SSL, or other security protocols. The end point and the server can then conduct their session securely by encrypting and decrypting their communications using the keys exchanged as part of the agreed upon security protocol. An effect is that they traffic they exchange, while passing through edge network 102, is neither visible to nor understood by edge network 102. Edge network 102 has heretofore been unable to optimize the flow of such traffic through the network based on its inherent characteristics because of the opaque nature of encrypted communications.

Figure 2:
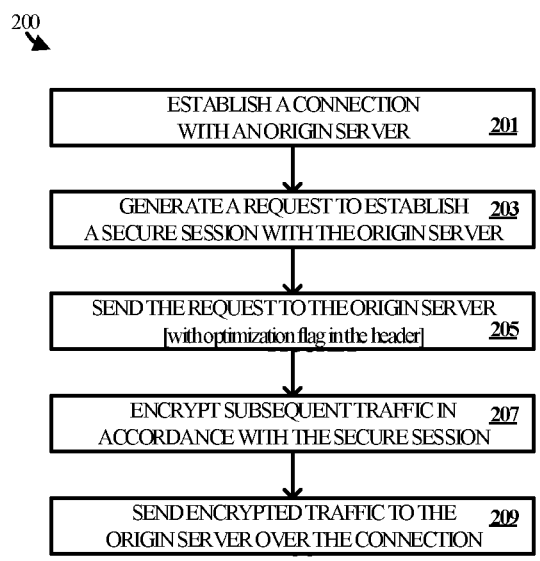
FIG. 2 illustrates a client-side optimization process in an implementation.

In an advance, end points 111 employ an optimization process 200 described in FIG. 2 that allows the end points 111 to signal to infrastructure service 101 information about traffic soon to commence within the context of secure sessions. Infrastructure service 101 employs a corresponding process, illustrated in FIG. 3 with respect to optimization process 300, that allows the service to apply one or more optimizations to the traffic based on the information signaled to it by the end points 111.

Optimization process 200 may be implemented in program instructions in the context of any of the software applications, modules, components, or other such programming elements of the end points 111. Optimization process 300 may also be implemented in program instructions in the context of any of the software applications, modules, components, or other such programming elements of the servers, routers, switches, or other equipment within the data centers of infrastructure service 101. The program instructions direct the underlying physical or virtual computing system or systems to operate as follows, referring parenthetically to the steps in FIG. 2 and FIG. 3 in the context of the operational architecture 100 of FIG. 1.

Referring to FIG. 2, an end point employing optimization process 200 (e.g. end point 115) establishes a transport layer connection with an origin server (e.g. server 125) (step 201). Having established the connection, the end point generates a request to establish a secure session between the end point and the origin server (step 203). The request includes information in a header of the request that flags subsequent session traffic as subject to one or more optimizations performed by an edge network through which the traffic flows. The end point then sends the request to the origin server to initiate a handshake process that establishes the parameters of the secure session between the end point and the origin server (step 205).

Upon establishing the secure session, the end point encrypts the session traffic in accordance with the parameters of the session (step 207). For example, traffic sent to the origin server can be encrypted with an encryption key exchanged during the handshake such that it can be decrypted at the receiving end. The end point sends the encrypted traffic to the origin server via one or more paths that traverse the edge network such that the edge network can apply the subject optimizations to the traffic.

Figure 3:
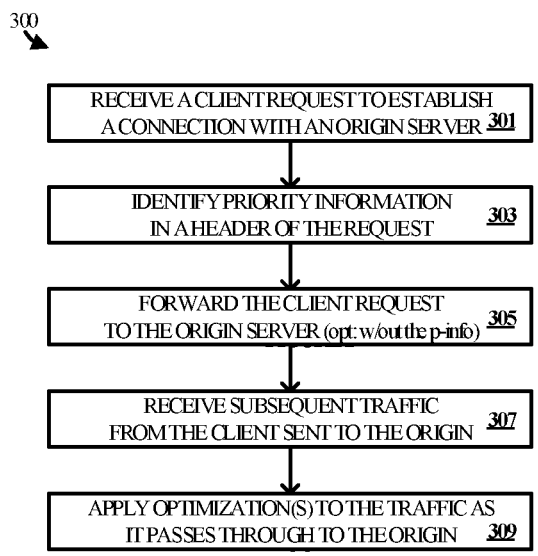
FIG. 3 illustrates a server-side optimization process in an implementation.

Referring to FIG. 3, optimization process 300 is implemented on one or more elements of an infrastructure service such as the servers, routers, switches, or other elements of the data centers in the service (e.g. data center 103 in infrastructure service 101). The infrastructure service receives a request from a client such as end point 115 to establish a connection to an origin server, e.g. server 125 (step 301). As the end point has yet to establish a secure session with the origin, the infrastructure service is able to examine the contents of the message to identify the information in the request header (step 303). The presence of such information indicates to the infrastructure service that one or more optimizations are to be applied to the secure traffic sent on the connection. The infrastructure service removes the information from the request header and forwards the header to the origin (step 305).

Assuming that the end point and origin server are able to complete the handshake that establishes a secure session, the flow of secure traffic between the two commences. The infrastructure service receives the traffic sent from the end point to the origin server (step 307) and applies the one or more optimizations as the traffic flows through the network (step 309). The infrastructure service may optionally apply one or more optimizations to the return traffic sent by the origin server to the end point.

Referring back to FIG. 1, an example scenario is illustrated in brief with respect to end point 115 and server 125. In operation, end point 115 employs optimization process 200 and one or more computing elements within data center 103 employ optimization process 300.

To begin, end point 115 sends a domain name look-up request to DNS 118 to obtain the network address for a website, service, application, or other such destination. It is assumed for exemplary purposes that server 125 is the ultimate destination. However, infrastructure service 101 provides edge network 102 as a service to the origin in order to shield it from DDoS attacks, accelerate traffic, and/or cache content. DNS 118 therefore translates the domain name request into a network address that routes to data center 103 in edge network 102.

End point 115 proceeds to establish a connection 130 with server 125 in order to obtain content, engage in a secure transaction, engage in secure communications, or the like. The packets associated with the connection, such as the initial connection request and subsequent communications, traverse one or more of paths 110 from end point 115 to data center 103. From there, data center 103 replaces the network address (with which the packets reached data center 103) with an address that will route to server 125. In some cases, the second address terminates at data center 105 and must be replaced again with the address that terminates at server 125. The communications traverse one or more of paths 107 through edge network 102 to data center 105. Data center 105 then sends the packets via one or more of paths 120 to origin server 125.

Having established a connection with origin server 125, end point 115 next sends a request 131 to establish a secure session over the connection 130. Request 131 includes a header populated with information that flags the request to data center 103. Data center 103 receives the request, detects the flag, and prepares to optimize the session traffic once the secure session has been setup. Data center 103 forwards the request via one of paths 107 to data center 105, which sends the request on to server 125 via one of paths 120. Data center 103, data center 105, or some other element in edge network 102 may optionally strip request 131 of the header information before forwarding it to server 125. The same addressing schema applies whereby end point 115 reaches data center 103 using the network address supplied to it by DNS 118. That address may terminate in data center 103, in which case data center 103 replaces it with an address that terminates at data center 105 or server 125. DNS 118 may communicate with DNS 108 in order to obtain the address for data center 103. In addition, DNS 108 may be leveraged by data center 103 to obtain the address for data center 105 and/or server 125.

On the return path, server 125 replies to the communications sent by end point 115 using the from-address provided in the packets. The from-address may be that of an element in data center 105, an element in data center 103, or even the network address of end point 115. The return traffic traverses one of paths 120, paths 107, and paths 110.

Request 131 is the first message in a handshake between end point 115 and server 125 that establishes the secure session. Cryptographic keys are exchanged as part of the handshake, allowing end point to encrypt subsequent traffic 133 that it sends to server 125, and for server 125 to encrypt subsequent return traffic 135 that it sends to end point 115. Both ends of the secure session can decrypt the traffic using the same or other cryptographic keys exchanged during the handshake.

Infrastructure service 101 applies one or more optimizations to the subsequent traffic as it flows through edge network 102 during the session. As an example, infrastructure service 101 may pick one of routes a, b, and c between data center 103 and data center 105 over which to send the secure traffic destined for server 125. The outgoing route through edge network 102 can be controlled or influenced by, for example, sending the outgoing traffic from a specific network address, to a specific network address, or a combination of both. In another example, the incoming route from end point 115 to data center 103 can be controlled or influenced by supplying end point 115 with a specific network address to which to send traffic. The outgoing route from data center 103 to end point 115 can also be controlled or influenced by sending traffic from a specific network address. The outgoing route from data center 105 to server 125 can also be controlled or influenced by sending traffic from a specific address, while the incoming route from server 125 to data center 105 can be controlled or influenced by providing server 125 with a specific destination address for its traffic.

The incoming and outgoing routes taken by traffic sent and received by end points 111 and origin server 121 can be controlled or influenced by the intelligent allocation of network addresses within infrastructure service and the intelligent announcement of network addresses to the one or more networks that connection to data centers 103 and 105 and the other elements of edge network 102 and infrastructure service 101 in general.

In a highly simplified example, infrastructure service 101 may allocate three network addresses to a given server in data center 103. Infrastructure service 101 may then announce a different one of the three addresses to each of three transit networks that carry traffic to data center 103. While all three addresses route to the same server or node within data center 103, they can be used to influence the path taken from end points 111 to data center 103.

To illustrate: assume that a first route (or network address) "j" is announced to first transit network; that a second route (or network address) "k" is announced to a second transit network; and that a third route (or network address) "l" is announced to a third transit network. The transit networks announce the routes (or addresses) to each other and to other networks via protocols such as the border gateway protocol (BGP). In this manner, a network downstream from edge network 102 will choose which transit network to use in order to reach the server that was assigned all three addresses in data center 103.

For instance: a packet sent by end point 115 to address j will take a path that includes the first transit network; a packet addressed to route k will take a different path that includes the second transit network; and a packet addressed to route 1 will take yet another path that includes the third transit network. Thus, infrastructure service 101 can control or influence which path is taken by incoming traffic from end points 111 by selecting a specific network address within its data centers. The selected address may be communicated to the end point during the domain name translation process, via DNS 108 and DNS 118. Alternatively (or in addition), the selected address may be communicated to the end point by sending return traffic to the end point from the selected address. The end point would thus reply to the "from" address, resulting in its traffic flowing over the preferred route or path.

The same or a similar principle would apply to traffic sent and received between data centers 103 and 105. As edge network 102 is an overlay network on top of one or more physical networks, different routes or addresses could be announced to the networks so as to influence the path taken between data centers. For instance, routes a, b, and c could be allocated to a node within data center 103. Then, route a could be announced to a first transit network, route b to a second transit network, and route c to a third transit network. Routes a', b', and c' could be allocated to a node within data center 105 and announced to the same or different transit network respectively. It may be appreciated that routes a, b, and c may be the same addresses as routes j, k, and l in some implementations, or within the same range of sub-range of addresses. Routes a', b', and c' may be the same addresses as routes x, y, and z in some implementations, or within the same range or sub-range of addresses.

Infrastructure service 101 is also able to control or influence how traffic flows to and from data center 105 and origin servers 121. For example, routes x, y, and z may be allocated to a server node within data center 105 and announced to a first transit network, a second transit network, and a third transit network accordingly. The transit networks then propagate the route announcements to other networks to which they connected. Infrastructure service 101 can send traffic from data center 105 to an origin server using address x, for example, to ensure that return traffic flows over the first network. Address y can be used to route return traffic over the second transit network and address z can be used to route return traffic over the third transit network.

Optionally, or in addition to the techniques discussed above, infrastructure service 101 may control at least a portion of the outbound path from a given data center by selecting which transit network to utilize, regardless of whether the portion of the path from the transit network to the other data center could be controlled or influenced via address selection.

Figure 4:
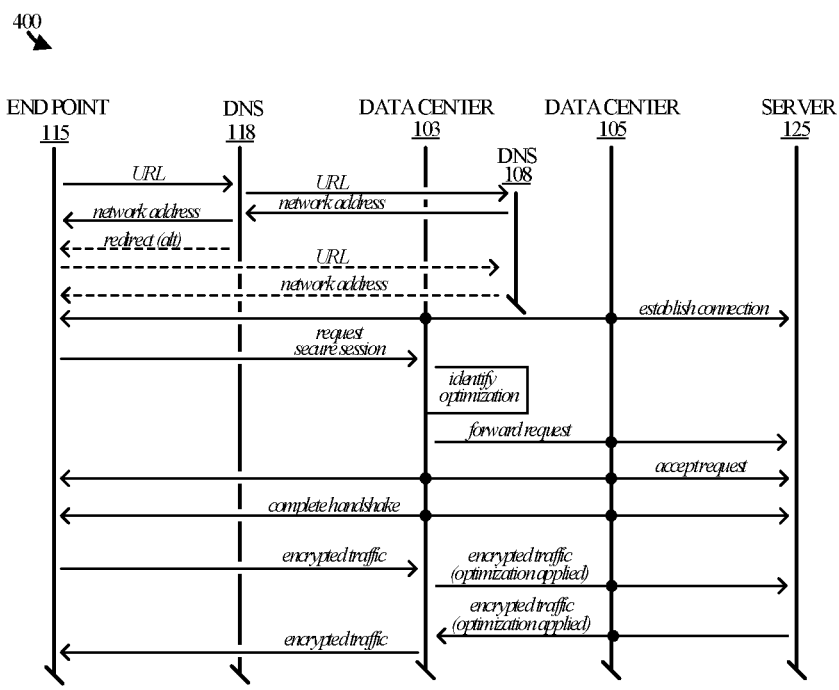
FIG. 4 illustrates an operational sequence in an implementation.

FIG. 4 illustrates an operational sequence 400 in an example of optimization process 200 and 300 in the context of operational architecture 100. To begin, end point 115 sends a request to DNS 118 to translate a uniform resource locator (URL) into a network address (e.g. an IP address). DNS 118 looks up the domain name in the URL and determines to either forward the request to DNS 108 or redirect end point 115 to DNS 108. In either case, end point 115 ultimately obtains the network address corresponding to the URL.

Being that infrastructure service 101 provides various edge services to customer origins, the network address routes to a node in edge network 102. Thus, when end point 115 attempts to establish a transport layer connection with an origin server, the packets route to a node in data center 103 that has been assigned the network address. Data center 103 receives the packets and forwards them on to an origin sever at the customer—server 125 in this example. Data center 103 may send the packets to server 125 via data center 105, although data center 105 need not be in the path. Data center 103 may also change the "from" address in the packets from the address of end point 115 to the address of the node in data center 103. If data center 105 is included in the path, then data center 105 may also change the "from" address to the address of one of its nodes such as a server, router, switch, hub, load balancer, or the like.

Once the connection has been established, end point 115 sends a request to establish a secure connection with server 125 over the connection. Once again, the request may be addressed to a node in data center 103 or elsewhere in edge network 102, even though the session ultimately will be established with server 125. The request includes information in its header that signals to data center 103 that the secure session should be subject to one or more potential optimizations.

Data center 103 receives the request and recognizes it as the first message in a protocol handshake between end point 115 and server 125. Next, data center 103 parses the header of the request to determine whether or not the secure session qualifies for one or more optimizations. Optionally, the information in the header may also specify which specific optimization(s) to apply to the traffic.

Data center 103 then forwards the request to server 125. Once again, the request may be routed through data center 105 or optionally may bypass data center 105. Server 125 accepts the request and proceeds to complete the handshake with end point 115. With the appropriate cryptographic keys in-hand, end point 115 is able to transmit encrypted traffic within the context of the session to server 125. Likewise, server 125 is able to transmit encrypted traffic to end point 115. Moreover, infrastructure service 101 is able to apply one or more optimizations to the traffic as it traverses edge network 102 and one or both of data center 103 and data center 105.

Figure 5:
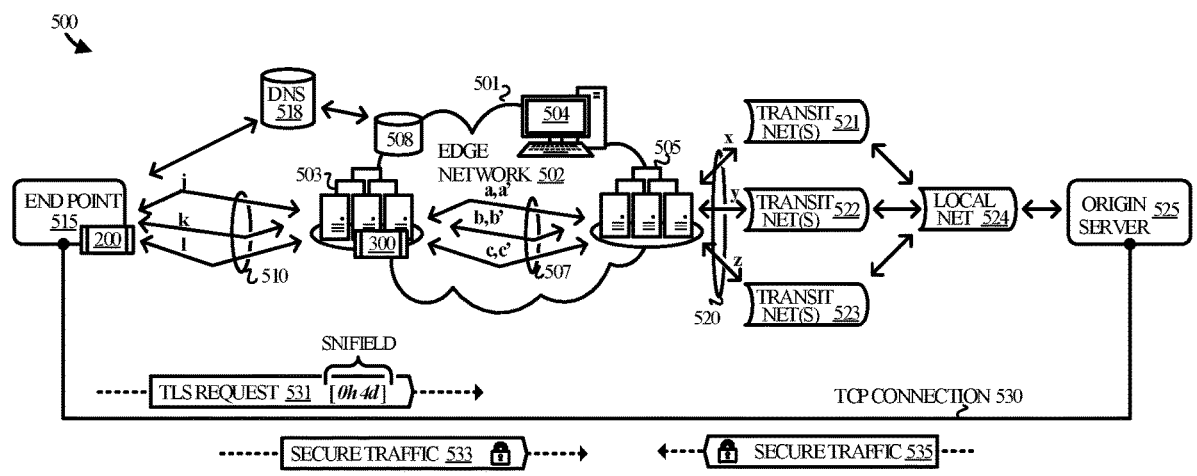
FIG. 5 illustrates another operational architecture in an example implementation of secure traffic optimization.

FIG. 5 illustrates an operational architecture 500 in another example implementation of secure traffic optimization. Operational architecture 500 includes infrastructure service 501 in communication with end point 515 and origin server 525. Infrastructure service 501 provides one or more functions for and/or on behalf of its customers such as edge computing, content caching, image optimization, content streaming, cloud security, load balancing, and traffic acceleration.

Infrastructure service 501 includes one or more data centers represented by data center 503 and data center 505. Infrastructure service 501 also includes edge network 502 which provides connectivity between the data centers of the service. Edge network 502 is representative of one or more physical and/or virtual networks capable of connecting multiple data centers. Edge network 502 may be, for example, an overlay network that relies on the physical connections provided by one or more other network providers such transit network providers, Internet backbone providers, and the like.

Edge network 502 provides routes 507 to and from the data centers 503 and 505, represented by routes a, b, and c. Data center 503 and data center 505 each serve as a PoP at an interface point between edge network 502 and other networks via which infrastructure service 501 may communicate with end point 515 and origin server 525. Examples include transit networks, local Internet service provider (ISP) networks, local area networks (LANs), wide area networks (WANs), wired and wireless networks, virtual networks, software defined networks, and any combination or variation thereof.

Data centers 503 and 505 communicate with end point 515, origin server 525, and each other by way of any suitable networking protocol such as Internet Protocol version 4 (IPv4), IPv6, Internetwork Packet Exchange (IPX), Open Shortest Path First (OSPF) IPsec, and any other network protocol, variation, or combination thereof. Data centers 503 and 505 may in some implementations be connected at the data link layer in accordance with the Ethernet protocol, ATM, PPP, or other suitable protocols.

Data center 503 provides a point-of-presence where edge network 502 interfaces with the one or more networks that carry traffic to and from end point 515, while data center 505 provides a point-of-presence where edge network 502 interfaces with the one or more networks that carry traffic to and from origin server 525. Edge network 502 may include additional data centers that serve as additional PoPs for interfacing with the same or other networks as data centers 503 and 505.

End point 515 is representative of any computing devices capable of communicating with origin server 525 via infrastructure service 501. Examples include—but are not limited to—laptop and desktop computers, tablet computers, mobile phones, wearable devices, entertainment devices, gaming devices, other server computers, Internet of Things (IoT) devices, or any other type of end point device.

Origin server 525 is representative of any physical or virtual computing server capable of communicating with end point 515 via infrastructure service 501. Examples include, but are not limited to, server computers and data storage devices deployed on-premises, in the cloud, in a hybrid cloud, or elsewhere, by enterprises, organizations, individuals, and the like. Examples of content included text, images, video, web pages, objects, applications, transactions, databases, or any other type of content.

End point 515 communicates with infrastructure service 501 and origin server 525 over transport layer connection protocols such as the transmission control protocol (TCP), the stream control transmission protocol (SCTP), and other connection-oriented protocols. Connectionless protocols such as the user datagram protocol (UDP) may also be employed in some implementations.

Domain name system (DNS) 518 is a highly simplified representation of a system capable of associating domains names with network addresses. End point 515 communicates with DNS 518 to translate URLs to network addresses. DNS 508 is representative of a system within or associated with infrastructure service 501 that is also capable of associating domain names with network addresses. DNS 508 may communicate with DNS 518 in some examples to resolve the network address for a domain name. In other examples, DNS 518 may redirect an end point to the network address for DNS 508 so that DNS 508 can resolve the domain name to a network address. Other variations are possible and are considered within the scope of the present disclosure.

Operational architecture 500 also includes transit networks 521, 522, and 523. Transit networks 521, 522, and 523 provide interconnectivity between edge network 502 and one or more other networks such as local network 524. Local network 524 in this example provides local connectivity to origin server 525. Transit networks 521, 522, and 523 are each representative of networks that are typically larger than most Internet service providers and that provide transit across the Internet from one network to another. Thus, transit networks 521, 522, and 523 provide transit for communications between edge network 502 and local network 524.

Traffic sent or received between end point 515 and edge network 502 may take one of multiple routes 510 to data center 503, represented by routes j, k, and l. Routes j, k, and l represent network addresses or ranges of addresses that infrastructure service 501 announces to one or more transit network as discussed in more detail with respect to FIG. 7. Traffic sent or received between edge network 502 and origin server 525 may take one of multiple routes 520 to data center 503, represented by routes x, y, and z. Routes x, y, and z represent network addresses or ranges of addresses that infrastructure service 501 announces to one or more transit networks.

Figure 6:
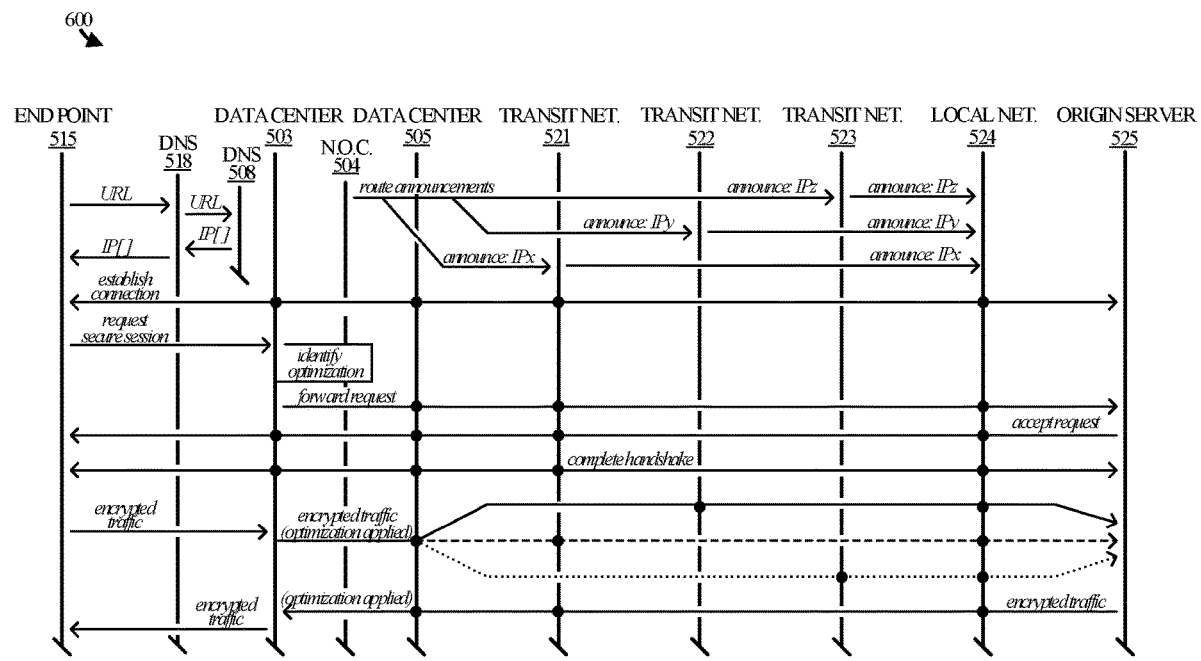
FIG. 6 illustrates an operational sequence in an implementation.

FIG. 6 illustrates an operational scenario 600 in which end point 515 employs optimization process 200 to signal to infrastructure service 501 information about traffic soon to commence within the context of secure sessions, while infrastructure service 501 employs optimization process 300. Optimization process 200 may be implemented in program instructions in the context of any of the software applications, modules, components, or other such programming elements of the end point 515. Optimization process 300 may also be implemented in program instructions in the context of any of the software applications, modules, components, or other such programming elements of the servers, routers, switches, or other equipment within the data centers of infrastructure service 501.

In operational scenario 600, end point 515 sends domain name translation requests to DNS 518 to translate a URL or other such identifier into a network address. DNS 518 may communicate with DNS 508 in edge network 502 to resolve the domain name request. Alternatively, DNS 518 may redirect end point 515 to DNS 508 by replying to the request with a network address that routes to DNS 508. End point 515 may then send the translation request to DNS 508. In either case, end point 515 obtains the network address which routes to a PoP in edge network 502.

At a different time, route announcements are made from a network operations center (NOC) 504 within edge network 502. NOC 504 announces three routs (x, z, and z) to transit networks 521, 522, and 523 respectively. The route announcements allow the operator of infrastructure service 501 to control or influence the incoming and outgoing routes taken by traffic sent and received by end points and origin servers. The transit networks 521, 522, and 523 announce the routes to each other and to other networks via protocols such as the border gateway protocol (BGP). This causes a network downstream from edge network 502 to use the associated one of the transit networks to route traffic to PoPs in edge network 502. For example, traffic sent by origin server 525 to address x will be routed by local network 524 to transit network 521; traffic sent by origin server 525 to address y will be routed by local network 524 to transit network 522; and traffic sent by origin server 525 to address z will be routed by local network 524 to transit network 523.

End point 515 addresses packets to the network address provided by DNS 518 and/or DNS 508 and sends them via one of routes 510 to edge network 502. In an example of content caching, end point 515 sends content requests (e.g. HTTP GET messages) to the network address, which routes to a PoP in edge network 502. The requested content may be served from the PoPs or—if the content has not yet been cached or needs to be refreshed—can be obtained from the origin and then served to end point 515.

End point 515 establishes transport layer connections with the servers in edge network 502 in order to obtain the requested content. End point 515 may also establish transport layer connections with servers at the origin, as opposed to (or in addition to) the servers in edge network 502, in order to obtain content directly from the origin, engage in secure transactions or communications, or for other reasons.

Having established connection 530 with origin server 525, end point 515 proceeds to setup a secure session with origin server 525 in accordance with TLS, SSL, or other security protocols. This includes generating a request 531 to establish a secure session between the end point 515 and the origin server in this example. The request includes information in a header of the request that flags subsequent session traffic as subject to one or more optimizations performed by an edge network through which the traffic flows. The request may populate a service name identification (SNI) field with the information in lieu of (or in addition to) the host name information that would normally populate the SNI field. The end point 515 then sends the request to the origin server 525 to initiate a handshake process that establishes the parameters of the secure session between the end point and the origin server.

Upon establishing the secure session, end point 515 encrypts the session traffic in accordance with the parameters of the session. For example, secure traffic 533 sent to the origin server can be encrypted with an encryption key exchanged during the handshake such that it can be decrypted at the receiving end. The end point sends the encrypted traffic to the origin server via one or more paths that traverse the edge network such that the edge network can apply the subject optimizations to the traffic. Secure traffic 535 sent from the origin server 525 to end point 515 can also be encrypted per the parameters of the secure session.

From the perspective of infrastructure service 501, one or more elements of the service such as the servers, routers, switches, or other elements of data center 503 receives the request from end point 515 to establish the connection 535 to origin server. Since the end point has yet to establish a secure session with the origin, infrastructure service 501 is able to examine the contents of the message to identify the information in the request header. The presence of such information indicates to the infrastructure service that one or more optimizations are to be applied to the secure traffic sent on the connection. The infrastructure service removes the information from the request header and forwards the header to the origin.

Assuming that the end point and origin server are able to complete the handshake that establishes a secure session, the flow of secure traffic between the two commences. Data center 503 receives the traffic sent from the end point 515 to the origin server and applies the one or more optimizations as the traffic flows through the network. Data center 503 and/or data center 505 may also apply one or more optimizations to the return traffic sent by the origin server to the end point.

As an example, infrastructure service 501 may pick one of routes a, b, or c between data center 503 and data center 505 over which to send the secure traffic destined for origin server 525. The outgoing route through edge network 502 can be controlled or influenced by, for example, sending the outgoing traffic from a specific network address, to a specific network address, or a combination of both. In another example, the incoming route from end point 515 to data center 503 can be controlled or influenced by supplying end point 115 with a specific network address to which to send traffic. The outgoing route from data center 503 to end point 515 can also be controlled or influenced by sending traffic from a specific network address. The outgoing route from data center 505 to server 525 can also be controlled or influenced by sending traffic from a specific address, while the incoming route from server 525 to data center 505 can be controlled or influenced by providing server 525 with a specific destination address for its traffic.

In FIG. 6, infrastructure service 501 is also able to control or influence how traffic flow to and from data center 505 and origin server 525. For example, routes x, y, and z may be allocated to a server node within data center 505 and as discussed are announced to transit networks 521, 522, and 523 respectively, which propagate the route announcements to other networks to which they connected. Infrastructure service 501 can send traffic from data center 505 to origin server 525 using address x, for example, to ensure that return traffic flows over transit network 521. Address y can be used to route return traffic over transit network 522, and address z can be used to route return traffic over transit network 523. Such decisions may be made in the interest of speed, for example, whereby one transit network is faster than the other, an interconnect from edge network 502 to the transit network is faster than the other interconnects, or the interconnect from one transit network with local network 524 is faster than the interconnects of the other transit networks. Reliability, cost, and other factors may also contribute to such routing decisions.

Optionally, or in addition to the techniques discussed above, infrastructure service 501 may control at least a portion of the outbound path from a given data center by selecting which transit network to utilize, regardless of whether the portion of the path from the transit network to the other data center could be controlled or influenced via the intelligent address announcements and selection discussed above.

The same or a similar principle would apply to traffic sent and received between data centers 503 and 505. As edge network 502 is an overlay network on top of one or more physical networks, different routes or addresses could be announced to the networks so as to influence the path taken between data centers. For instance, routes a, b, and c could be allocated to a node within data center 503. Then, route a could be announced to a first transit network, route b to a second transit network, and route c to a third transit network. Routes a', b', and c' could be allocated to a node within data center 505 and announced to the same or different transit network respectively. It may be appreciated that routes a, b, and c may be the same addresses as routes j, k, and l in some implementations, or within the same range of sub-range of addresses. Routes a', b', and c' may be the same addresses as routes x, y, and z in some implementations, or within the same range or sub-range of addresses.

Figure 7:
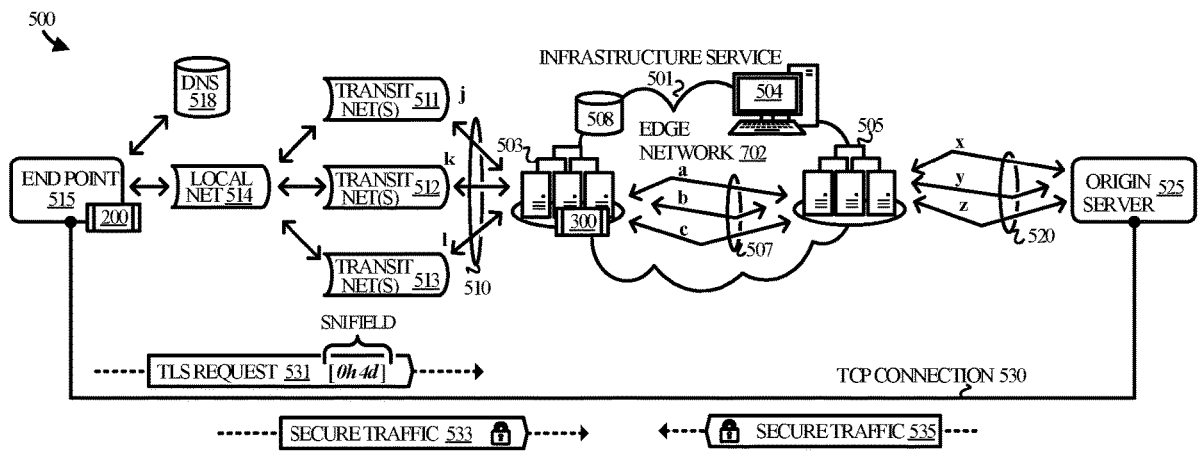
FIG. 7 illustrates a variation on the operational architecture of FIG. 5 in an example implementation of secure traffic optimization.

FIG. 7 illustrates a variation of operational architecture 500 in which routes 510 are expanded to show transit networks 511, 512, and 513. Transit networks 511, 512, and 513 may all differ from transit networks 521, 522, and 523 in some implementations. In other implementations, one or more of transit networks 511, 512, and 513 may be the same as one or more of transit networks 521, 522, and 523. It may be appreciated that the concepts described with respect to FIG. 7 and FIG. 8 may be combined with those discussed with respect to FIG. 5 and FIG. 6.

Figure 8:
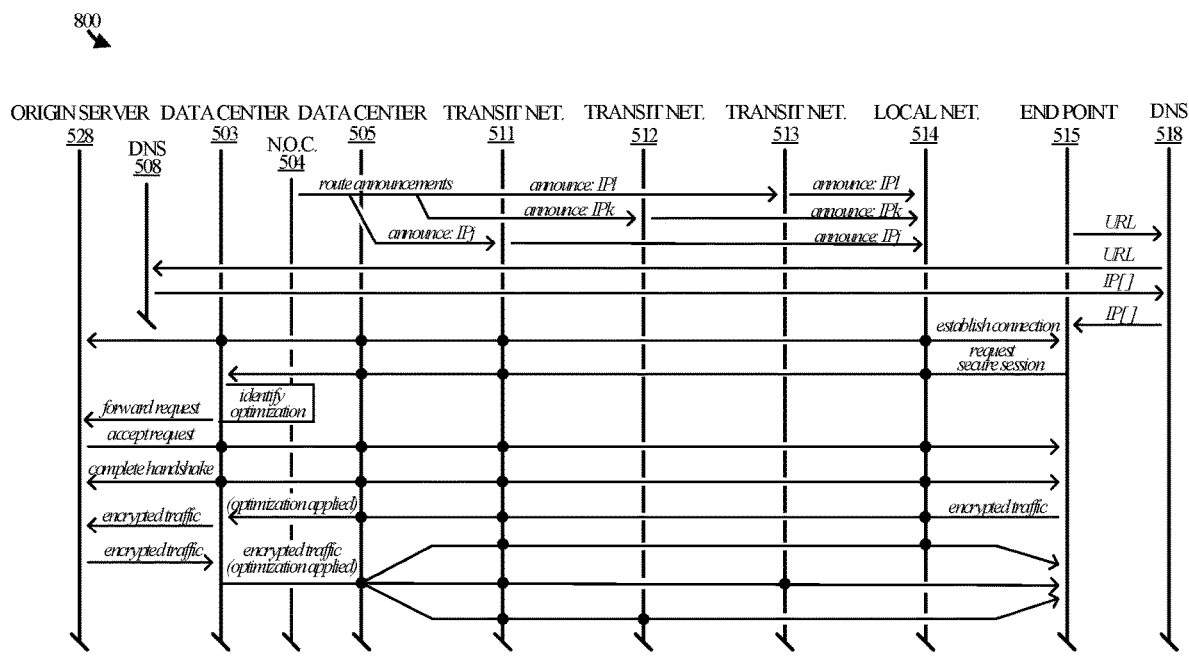
FIG. 8 illustrates another operational sequence in an implementation.

In operational scenario 800 of FIG. 8, end point 515 employs optimization process 200 to signal to infrastructure service 501 information about traffic soon to commence within the context of secure sessions, while infrastructure service 501 employs optimization process 300.

Referring to FIG. 8, route announcements are made from a network operations center (NOC) 504 within edge network 502. NOC 504 announces three routs (j, k, and l) to transit networks 511, 512, and 513 respectively. The route announcements allow the operator of infrastructure service 501 to control or influence the incoming and outgoing routes taken by traffic sent and received by end point 515. The transit networks 511, 512, and 513 announce the routes to each other and to other networks via protocols such as the border gateway protocol (BGP). This causes a network downstream from edge network 502 to use the associated one of the transit networks to route traffic to PoPs in edge network 502. For example, traffic sent by end point 515 address y will be routed by local network 514 to transit network 511; traffic sent by end point 515 to address b will be routed by local network 514 to transit network 512; and traffic sent by end point 515 to address z will be routed by local network 514 to transit network 513.

End point 515 sends domain name translation requests to DNS 518 to translate a URL or other such identifier into a network address. DNS 518 may communicate with DNS 508 in edge network 502 to resolve the domain name request. Alternatively, DNS 518 may redirect end point 515 to DNS 508 by replying to the request with a network address that routes to DNS 508. End point 515 may then send the translation request to DNS 508. In either case, end point 515 obtains the network address which routes to a PoP in edge network 502.

End point 515 addresses packets to the network address provided by DNS 518 and/or DNS 508 and sends them via one of routes 510 to edge network 502. In an example of content caching, end point 515 sends content requests (e.g. HTTP GET messages) to the network address, which routes to a PoP in edge network 502. The requested content may be served from the PoPs or—if the content has not yet been cached or needs to be refreshed—can be obtained from the origin and then served to end point 515.

End point 515 establishes transport layer connections with the servers in edge network 502 in order to obtain the requested content. End point 515 may also establish transport layer connections with servers at the origin, as opposed to (or in addition to) the servers in edge network 502, in order to obtain content directly from the origin, engage in secure transactions or communications, or for other reasons.

Having established connection 530 with origin server 525, end point 515 proceeds to setup a secure session with origin server 525 in accordance with TLS, SSL, or other security protocols. This includes generating a request 531 to establish a secure session between the end point 515 and the origin server in this example. The request includes information in a header of the request that flags subsequent session traffic as subject to one or more optimizations performed by an edge network through which the traffic flows. The request may populate a service name identification (SNI) field with the information in lieu of (or in addition to) the host name information that would normally populate the SNI field. The end point 515 then sends the request to the origin server 525 to initiate a handshake process that establishes the parameters of the secure session between the end point and the origin server.

Upon establishing the secure session, end point 515 encrypts the session traffic in accordance with the parameters of the session. For example, secure traffic 533 sent to the origin server can be encrypted with an encryption key exchanged during the handshake such that it can be decrypted at the receiving end. The end point sends the encrypted traffic to the origin server via one or more paths that traverse the edge network such that the edge network can apply the subject optimizations to the traffic. Secure traffic 535 sent from the origin server 525 to end point 515 can also be encrypted per the parameters of the secure session.

From the perspective of infrastructure service 501, one or more elements of the service such as the servers, routers, switches, or other elements of data center 503 receives the request from end point 515 to establish the connection 535 to origin server. As the end point has yet to establish a secure session with the origin, infrastructure service 501 is able to examine the contents of the message to identify the information in the request header. The presence of such information indicates to the infrastructure service that one or more optimizations are to be applied to the secure traffic sent on the connection. The infrastructure service removes the information from the request header and forwards the header to the origin.

Assuming that the end point and origin server are able to complete the handshake that establishes a secure session, the flow of secure traffic between the two commences. Data center 503 receives the traffic sent from the end point 515 to the origin server and applies the one or more optimizations as the traffic flows through the network. Data center 503 and/or data center 505 may also apply one or more optimizations to the return traffic sent by the origin server to the end point.

As an example, infrastructure service 501 is also able to control or influence how traffic flow to and from data center 505 and end point 515. For example, routes j, k, and l may be allocated to a server node within data center 503 and as discussed are announced to transit networks 511, 512, and 513 respectively, which propagate the route announcements to other networks to which they connected. Infrastructure service 501 can send traffic from data center 503 to end point 515 using address j, for example, to ensure that return traffic flows over transit network 511. Address k can be used to route return traffic over transit network 512, and address l can be used to route return traffic over transit network 513. Such decisions may be made in the interest of speed, for example, whereby one transit network is faster than the other, an interconnect from edge network 502 to the transit network is faster than the other interconnects, or the interconnect from one transit network with local network 514 is faster than the interconnects of the other transit networks. Reliability, cost, and other factors may also contribute to such routing decisions.

Optionally, or in addition to the techniques discussed above, infrastructure service 501 may control at least a portion of the outbound path from a given data center by selecting which transit network to utilize, regardless of whether the portion of the path from the transit network to the other data center could be controlled or influenced via the intelligent address announcements and selection discussed above.

Figure 9:
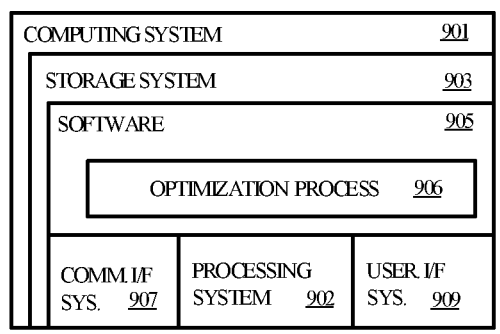
FIG. 9 illustrates a computing system suitable for implementing the various operational examples, environments, architectures, processes, scenarios, and sequences discussed below with respect to the Figures.

FIG. 9 illustrates computing system 901 that is representative of any system or collection of systems in which the various processes, programs, services, and scenarios disclosed herein may be implemented. Examples of computing system 901 include, but are not limited to, server computers, routers, web servers, cloud computing platforms, and data center equipment, as well as any other type of physical or virtual server machine, physical or virtual router, container, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements optimization process 906, which is representative of the optimization processes discussed with respect to the preceding Figures. When executed by processing system 902, software 905 directs processing system 902 to operate as described herein for at least the various processes, operational scenarios, and sequences discussed in the foregoing implementations. Computing system 901 may optionally include additional devices, features, or functionality not discussed here for purposes of brevity.

Referring still to FIG. 6, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media that is readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including optimization process 906) may be implemented in program instructions and among other functions may, when executed by processing system 902, direct processing system 902 to operate as described with respect to the various operational scenarios, sequences, and processes illustrated herein. For example, software 905 may include program instructions for implementing an optimization process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to optimize secure traffic as described herein. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a data center, comprising:
   receiving a first request to establish a network connection between an end point and an origin server;
   forwarding the request to the origin server;
   receiving a second request to establish a secure connection over the network connection;
   identifying information in a header of the second request that indicates that data exchanged over the secure connection should be subject to an optimization;
   forwarding the second request to the origin server;
   receiving first encrypted traffic over the secure connection; and
   applying the optimization to the first encrypted traffic.

2. The method of claim 1, wherein the optimization comprises selecting a preferred path for the traffic through the network.

3. The method of claim 1 wherein the request to establish the secure session comprises an initial message in a security handshake between the client application and the origin server.

4. The method of claim 1, wherein receiving the first request happens in response to a domain name translation request.

5. The method of claim 1, wherein forwarding the request to the origin server comprises forwarding the request to a second data center, wherein the second data center is not the origin server, but is configured to forward the request to the origin server.

6. The method of claim 1, wherein the first encrypted traffic comprises traffic encrypted using an encryption key held by the end point and the origin server.

7. The method of claim 1 wherein the network connection comprises a transmission control protocol (TCP) connection.

8. The method of claim 1 wherein the secure connection comprises a transport layer security (TLS) session.

9. The method of claim 1, wherein the second request to establish a secure connection comprises an initial message in a security handshake between the end point and the origin server.

10. A computing apparatus, comprising:
    one or more computer readable storage media;
    one or more processors operatively coupled with the one or more computer readable storage media; and
    program instructions stored on the one or more computer readable storage media that, when executed by the one or more processors, direct the computing apparatus to at least:
    receive a first request to establish a network connection between an end point and an origin server;
    forward the request to the origin server;
    receive a second request to establish a secure connection over the network connection;
    identify information in a header of the second request that indicates that data exchanged over the secure connection should be subject to an optimization;
    forward the second request to the origin server;
    receive first encrypted traffic over the secure connection; and
    apply the optimization to the first encrypted traffic.

11. The computing apparatus of claim 10, wherein the optimization comprises selecting a preferred path for the traffic through the network.

12. The computing apparatus of claim 10, wherein the request to establish the secure session comprises an initial message in a security handshake between the client application and the origin server.

13. The computing apparatus of claim 10, wherein receiving the first request happens in response to a domain name translation request.

14. The computing apparatus of claim 10, wherein forwarding the request to the origin server comprises forwarding the request to a second data center, wherein the second data center is not the origin server, but is configured to forward the request to the origin server.

15. The computing apparatus of claim 10, wherein the first encrypted traffic comprises traffic encrypted using an encryption key held by the end point and the origin server.

16. The computing apparatus of claim 10, wherein the network connection comprises a transmission control protocol (TCP) connection.

17. The computing apparatus of claim 10, wherein the secure connection comprises a transport layer security (TLS) session.

18. The computing apparatus of claim 10, wherein the second request to establish a secure connection comprises an initial message in a security handshake between the end point and the origin server.

19. A computing apparatus, configured to:
    receive a first request to establish a network connection between an end point and an origin server;
    forward the request to the origin server;
    receive a second request to establish a secure connection over the network connection;

identify information in a header of the second request that indicates that data exchanged over the secure connection should be subject to an optimization;

forward the second request to the origin server;

receive first encrypted traffic over the secure connection; and apply the optimization to the first encrypted traffic.

20. The computing apparatus of claim 19, wherein the optimization comprises selecting a preferred path for the traffic through the network.

* * * * *